Dec. 30, 1924.  
W. C. BEACH  
1,520,998  
COMBINED PAINT SPRAYING APPARATUS AND TANK  
Filed Oct. 21, 1922  2 Sheets-Sheet 1

INVENTOR  
Willard C. Beach  
BY Frak C. Fischer  
ATTORNEY

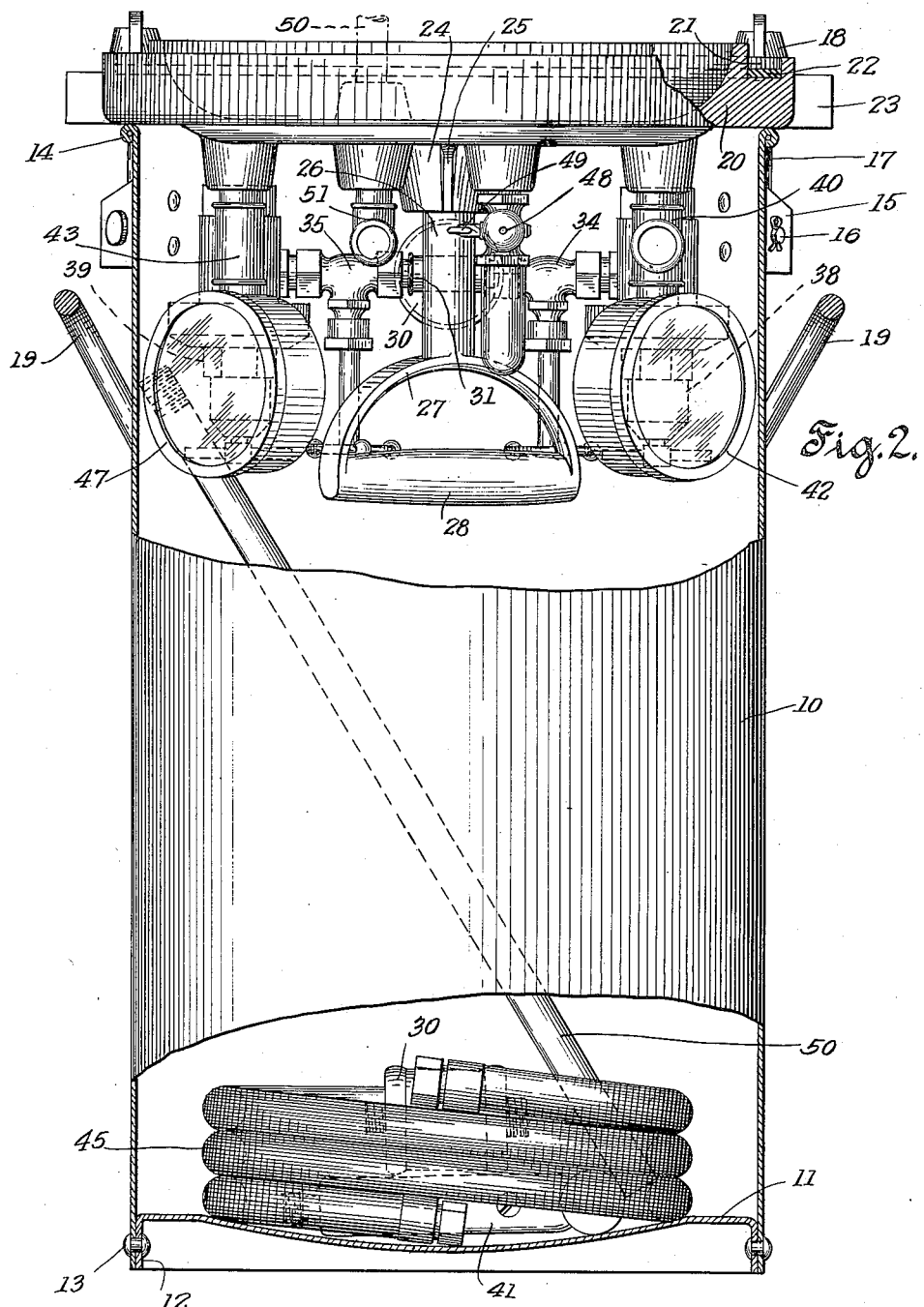

Patented Dec. 30, 1924.

1,520,998

UNITED STATES PATENT OFFICE.

WILLARD C. BEACH, OF NEWARK, NEW JERSEY.

COMBINED PAINT-SPRAYING APPARATUS AND TANK.

Application filed October 21, 1922. Serial No. 595,914.

*To all whom it may concern:*

Be it known that I, WILLARD C. BEACH, a citizen of the United States, residing at Newark, in the county of Essex and State of New Jersey, have invented certain new and useful Improvements in Combined Paint-Spraying Apparatus and Tank, of which the following is a specification.

This invention relates to improvements in apparatus for spraying paint or like liquids and has as its principal object to provide a tank having a reversible cover that in its normal operative position presents a plurality of appendages, as inlet and outlet connections, valves for controlling and reducing pressures, gages and safety devices, into readily accessible position, and which upon being inverted are wholly contained within the body of the tank, thus rendering it compact, easily handled and preventing injury to the several parts.

Another purpose is in the provision of a handle, arranged centrally on the cover, by which the apparatus can be easily carried.

A further aim is to utilize the interior of the tank, when not in operation, as a convenient housing for all of the tubes, spray heads and other devices used in connection when operating.

These and other minor objects, which will appear as the description progresses, are attained by the novel construction, combination and arrangement of parts hereafter described and shown in the accompanying drawing forming a material part of this disclosure, and in which:—

Figure 2 is a vertical sectional and elevational view of the tank, the head reversed and its attachment being in side elevation, and tubular connections shown as disposed within the tank.

Figure 1:
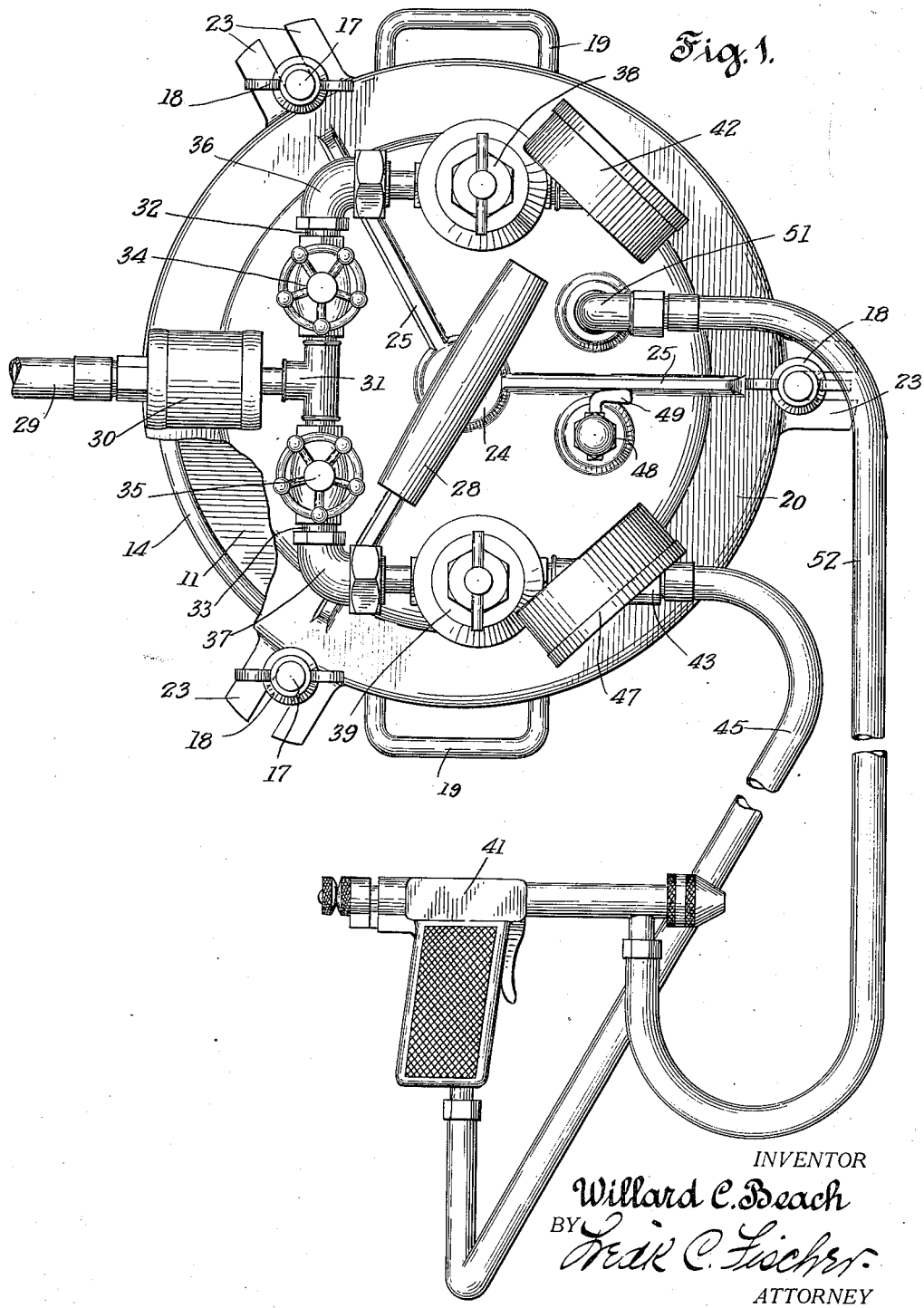
Figure 1 is a plan view of a complete spraying apparatus made in accordance with the invention, showing a spray head as attached and inlet from an air supply.

A straight walled tank is designated by the numeral 10 in the drawings, the same having a bottom 11 provided with a depending annular flange 12 secured by rivets 13 within the tank to constitute an air and liquid tight joint.

At the upper edge an outer beading 14 acts to strengthen the open end, below which are a plurality of uniformly spaced, forked lugs 15 riveted or otherwise secured to the tank and pivoted on pins 16 removably engaged in these lugs are bolts 17 provided on their screw-threaded portions with wing nuts 18 adapted to clamp a cover over the tank as further on described.

Rigid outstanding handles 19 are fixed upon opposite sides of the tank providing means for moving the same.

The head or cover 20 is substantially circular and provided with an annular recess 21 in which may be set a gasket 22 adapted to seat upon the beading 14 when drawn by the bolts 17, the latter being pivoted to swing between the forks 23, extending outwardly from the periphery of the cover in register with the tank lugs 15, the nuts 18 providing means for securing the necessary clamping effect.

Centrally of the head 20 is a hub 24 from which radiate re-enforcing ribs 25 directed towards the lugs and fixed in the hub to a stem 26 having divergent arms 27 carrying a hand grip 28, constituting a convenient form of carrier of the spade handle type extending into position for ready reach above all other devices mounted on the head, and by which the tank and its appurtenances may be manually moved from place to place.

A filter 30, acting as an inlet, is connected by a flexible tube 29 with an accumulator or other source of compressed air, the o ver opening of the filter communicating through a T fitting 31 with branches 32 and 33 respectively controlled by valves 34 and 35, and leading through elbows 36 and 37 to reducing valves 38 and 39.

The reducing valve 38 regulates the air pressure in the tank 10 to which it is connected through a T fitting 40 and nipple leading through the cover 20, the upper, opposite opening in the T 40 being connected with a pressure gage 42 by which the pressure on the paint can be readily seen and of course adjusted as desired by the valve 38.

The reducing valve 39 regulates the air pressure on the spraying head 41 through a T fitting 43 and flexible tube 45, the other opening in the T supporting a pressure gage 47 showing the pressure at the paint spraying head.

A relief valve 48, fixed in the head communicates with the interior of the tank and can be set to blow off automatically in case an excessive pressure should occur. By turning the handle 49 of the valve horizontally the air in the tank can be reduced to atmospheric pressure, the excess escaping through an opening in the side of the valve in a manner common to such devices.

A rigid pipe 50, removably engaging the lower side of the cover 20, normally extends downwardly nearly to the bottom of a paint container, conducting the paint upward through an elbow 51 fixed in the upper side of the cover and engaging a flexible tube 52 leading to the spray head 41, thus completing the operative parts of the apparatus.

When not in use the nuts 18 are relaxed permitting the bolts 17 to be turned down and the cover removed.

The pipe 50 is disconnected and placed at an angle in the tank, together with the spray head 41. The filter 30 is also disengaged and with the several flexible tubes in a coiled condition packed in the tank. The cover can then be reversed and, with its remaining appurtenances in a pendant position, entered into the top of the tank and there temporarily secured by the bolts and nuts as shown in Fig. 2.

As changes of construction could be made within the scope of the invention, it is intended that all matter contained in the foregoing description or shown in the accompanying drawing shall be interpreted as illustrative and not in a limiting sense.

Having thus described my invention, what I claim as new and desire to secure by Letters Patent; is:—

1. In a paint spraying apparatus, an open cylindrical tank, having handles fixed on its opposite sides, a reversible cover, means for securing said cover to the upper edge of said tank, a handle on said cover and devices for receiving, controlling, gaging and dispensing compressed air carried by said cover, all of said devices being disposable within said tank.

2. In a paint spraying apparatus, a plain cylindrical tank capable of withstanding internal pressure, said tank having a tight bottom and open top, handles on said tank, a cover suited to the open end of the tank, means for clamping said cover either side up to the tank, devices for receiving, controlling, gaging and dispensing compressed air secured on one one side of said cover, and a spade handle fixed centrally in said cover by which said tank may be manually carried, all of said devices being enterable in said tank upon reversing the cover.

3. In a paint spraying apparatus, a plain cylindrical tank capable of withstanding internal pressure, said tank having a tight bottom and open top, handles on said tank, a cover suited to the open end of the tank, means for clamping said cover either side up to the tank, means on said cover for supplying compressed air to said tank, means for relieving the pressure in said tank, means for removably clamping the cover to said tank, and a grip handle on said cover extending into position for manual operation when said cover is in one position and into said tank when the cover is in reversed position.

4. In a paint spraying apparatus, a portable tank composed of a plain cylinder having an impervious bottom fixed therein; a cover removably engaged thereover, said cover being reversible, means for clamping said cover to said tank in either position, an air receiving inlet, a pair of reducing valves, control valves in the branches leading from said inlet to said reducing valves, a tube leading from one of said reducing valves to the interior of said tank, a spray head, a flexible tube connecting between the other of said reducing valves and said head, a relief valve open to said tank, a safety valve combined with said relief valve, pressure gages intervening each of said reducing valves and their connections, all of said valves, gages and their appendages being fixed on the outer side of said cover so that when the cover is reversed all are contained within said tank, and a handle fixed centrally in said cover by which said tank can be conveyed when the cover is in operative position.

This specification signed and witnessed this 8th day of September, 1922.

WILLARD C. BEACH.

Witnesses:
FRED'K C. FISCHER,
FERDINAND NOLL.